United States Patent Office 3,539,704
Patented Nov. 10, 1970

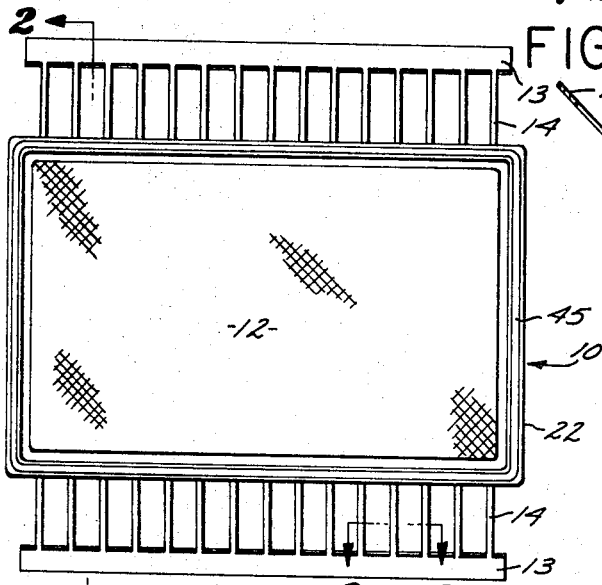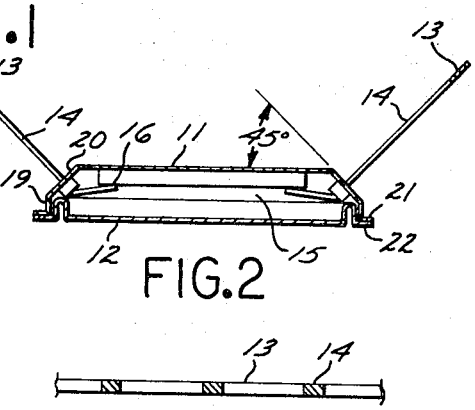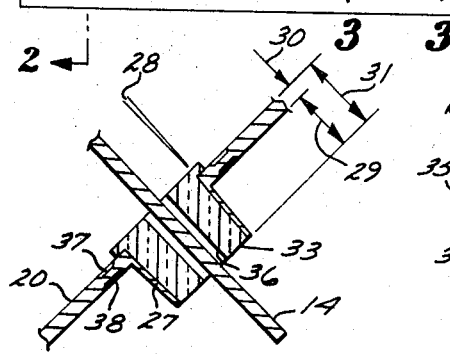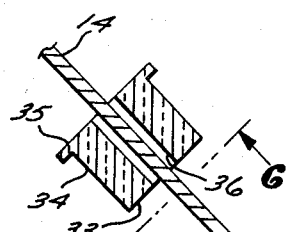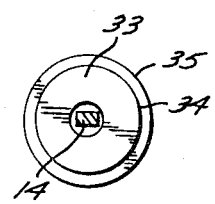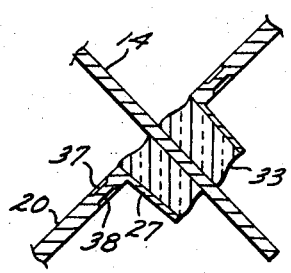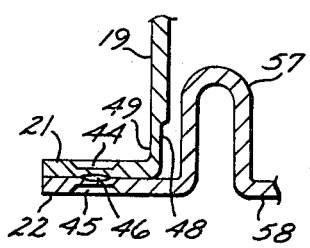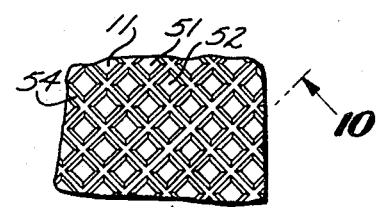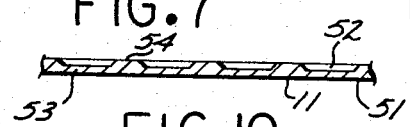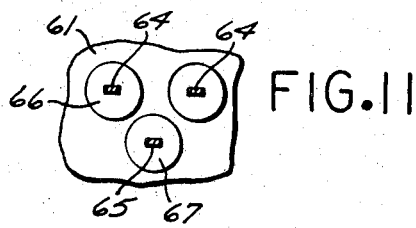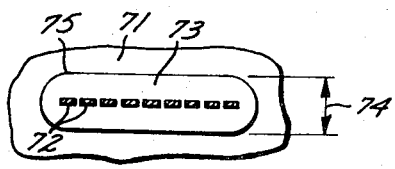

3,539,704
HERMETICALLY SEALED ENCLOSURE
Karl Sator, Anaheim, and Robert F. Gill, Costa Mesa, Calif., assignors, by mesne assignments, to Tekform Products Co., Anaheim, Calif., a corporation of Delaware
Filed July 19, 1967, Ser. No. 654,639
Int. Cl. H05k 5/06
U.S. Cl. 174—52
14 Claims

ABSTRACT OF THE DISCLOSURE

A planar enclosure having a lead-through assembly having a plurality of passages in a lead-through panel, which extends at a 45° angle to the plane of the enclosure, each of which passages is provided by an integrally formed tubular flange portion which extends at approximately 45° to the plane of the enclosure and receives a conductor therethrough held in sealing relation by insulator material, and said lead-through panel being further defined by a stress decoupling area around said flange portion; said enclosure mechanically decoupling said flange of each passage from a peripheral edge of the base and a cap of the enclosure to thereby permit the cap to be sealed to the base by means of a cold weld process, said cap being defined by a peripheral bellows portion having a U-shape cross section to permit the periphery of the cap to be deflected relative to the center section of the cap; and said enclosure having on the center sections of the base and the cap a large number of small sections which are thinner than the material of which the base and the cap are made.

---

This invention relates to improved electrical conductor lead-through assemblies and more specifically to lead-through assemblies which are particularly useful in miniature hermetically sealed electronic component enclosures.

Embodiments of the present invention are most often found in miniature electronic component enclosures such as the "flat-pak" type which enclosures are hermetically sealed in order to give longevity to the components therein. When integrated circuits are used within the enclosure, there is oftentimes need for a large number of electrical conductors extending from the exterior of the enclosure into the cavity in the interior of the enclosure. It has been found that it is extremely difficult to provide a large number of conductors extending through a lead-through portion of the enclosure. This is because, prior to the present invention, there was extreme difficulty in economically providing a large number of such conductors in the small space available.

For use in the "flat-pak" type of enclosure, the lead-through assembly must have a high reliability of performance during extended periods of time. Also, such units are sometimes subjected to unusual temperatures, and the temperatures to which they are subjected sometimes quickly change. Therefore, it is very desirable that the lead-through assembly have an ability to endure thermal environment and resist thermal shock.

Many different methods of sealing the cap of the "flat-pak" type enclosure to the base member are conventionally used. For example, solder or low temperature brazing are sometimes used. Ceramic and vitreous cementing and tungsten-inert gas welding, electron beam and laser welding are also used. Another method of sealing which is becoming increasingly used is where the cap is sealed to the base member by a method including ultrasonic energy-augmented pressure welding, which is a heatless process oftentimes referred to as a "cold weld" process.

It is a particular feature of embodiments of the present invention that assemblies incorporating the subject invention are able to survive the stresses normally attending the cold weld process. Partially, this is accomplished by the particular selection of the main enclosure shell material and the material insulating the conductor leads in the enclosure.

Of great importance to the invention fulfilling the requirements is the structure of the enclosure material which structure mechanically decouples the conductor and vitreous insulator material from the stresses induced during the closure process. This is accomplished by specifically shaping the enclosure material in defined ways for best results—thus permitting "flat-pak" type enclosures embodying the present invention to be closed by the economical cold weld process.

As an additional feature, the embodiments of the present invention include a particular sizing of the passages formed for receiving the conductors through the lead-through panel, which passages are of a particular diameter such that the bead of insulator material is self-supporting during the process of melting the material to cause it to seal with the conductor and the wall of the passage formed in the lead-through panel through which the conductors pass.

With the foregoing in mind, it is a major object of this invention to provide a new improved electronic conductor lead-through assembly.

Another object of this invention is to provide an electrical conductor lead-through assembly particularly useful in miniature hermetically sealed electronic component enclosures.

A further object of this invention is to provide an economically produced hermetically sealed electronic conductor component enclosure of the "flat-pak" type wherein the conductors extend from the enclosure at approximately a 45° angle to the plane of the flat-pak for reducing the stresses on the lead-through assembly by reducing the amount of bending required on the conductors for connecting them to the adjoining circuitry.

It is still another object of this invention to provide an improved electronic component enclosure which has areas therein which mechanically decouple the lead-through assembly from stresses and/or strains induced by the process of sealing the cap of the enclosure to the base member of the enclosure.

It is a still further object of this invention to provide an electronic component enclosure having flat conductors extending therefrom with the conductors arranged to minimize the stresses in the conductors as the conductors are bent to be connected to the circuitry with which the components in the enclosure are used.

Still another object of this invention is to provide an improved miniature electronic component enclosure having a large number of conductors extending through the shell of the enclosure in a very small space.

Other and further objects of this invention will become apparent in the detailed description below in connection with the attached drawings wherein:

FIG. 1 is a plan view of a first preferred embodiment of a miniature hermetically sealed electrical component enclosure incorporating the present invention;

FIG. 2 is a cross-sectional view of the enclosure in FIG. 1 as taken along line 2—2 in FIG. 1;

FIG. 3 is an enlarged fragmentary view of electrical conductors preferably used with the invention, as taken along line 3—3 in FIG. 1;

FIG. 4 is an enlarged fragmentary cross-sectional view disclosing details of an individual conductor lead-through assembly at an intermediate stage of manufacture;

FIG. 5 is an enlarged fragmentary cross-sectional view of the conductor and insulator member disclosed in FIG. 4;

FIG. 6 is an enlarged partial cross-sectional view of the insulator member and conductor as taken along line 6—6 in FIG. 5;

FIG. 7 is an enlarged fragmentary cross-sectional view of the assembly in FIG. 4 after the manufacturing process has been completed;

FIG. 8 is an enlarged fragmentary cross-sectional view disclosing the details of part of the means for mechanically decoupling from the enclosure the stresses induced by sealing with the cold weld process;

FIG. 9 is an enlarged fragmentary view disclosing structure of the enclosure for reducing stresses in the enclosure;

FIG. 10 is an enlarged fragmentary cross-sectional view of the section shown in FIG. 9 as taken along line 10—10 in FIG. 9;

FIG. 11 is an enlarged fragmentary view of a second preferred embodiment of the present invention where the conductors are disposed differently than in the first embodiment; and FIG. 12 is an enlarged fragmentary view disclosing a third preferred embodiment of the present invention.

Referring to the drawings and FIGS. 1 to 3 in particular, there is disclosed a first preferred embodiment of the present invention indicated generally by the arrow 10. The enclosure is of the "flat-pak" type and includes a base member, or enclosure body 11 (sometimes referred to as a header) with a cover or cap 12. As will be described in further detail below, there is a large number of conductors which are led from the exterior of the enclosure into the interior of the enclosure. For simplicity of handling, this is accomplished by a strip 13 of conductors 14 which extend from either side of the enclosure 10 into cavity 15 within the enclosure. The strips 13 of the conductors 14 are sometimes referred to as "lead-frames."

In the enclosure disclosed, the body member 11 is provided with side walls 19 on all four sides thereof. It is particularly important to note that lead-through portions, or panels, 20 make up a part of the side walls 19 shown on the right and the left as seen in FIG. 2. These lead-through portions 20 each preferably extend at a 45° angle to the plane of the base member 11. Additionally, it can be seen that the conductors 14 are of a flat cross section (see FIG. 3 in particular) with a minor dimension (in the vertical direction as seen in FIG. 3) and a major dimension (in a horizontal direction as seen in FIG. 3).

It should be noted that the conductors 14 extend from the enclosure 10 at approximately a 45° angle to the plane of the enclosure. Also, the conductors 14 are arranged so that the minor axis of the conductors 14 are in the plane that the conductors 14 would normally be bent in order to be connected to other circuitry. Stating it another way, the major axis of the cross section of each conductor extends parallel to the plane of the enclosure. Therefore, the conductors 14 may either be moved downwardly (as seen in FIG. 2) to associated circuitry or moved upwardly. With the preferred arrangement, the conductor need only be bent through 45° in order to be secured to the associated circuitry. If the conductor extended parallel to the plane of the flat-pak or at a right angle to said plane, it would be necessary in certain situations to bend the conductor 90°. Additionally, with the conductors 14 being arranged as they are, the conductors are normally bent in the direction of the minor axis of the cross section of the conductors. This means there would be considerably less stress impinged upon the conductors if they are bent than would be the case if the major diameter of the conductors were extending in the plane that the conductors would normally be bent. With this arrangement extra length can be provided on the cavity end of the conductors 14, and the conductors may be bent to make direct contact with the terminals on a substrate, or chip, 16 having circuitry thereon (see FIG. 2), with only a limited amount of stress on the conductor insulator seal.

The conductor is then bonded to the terminal and the need for a separate jumper wire for each conductor is eliminated. In FIG. 2, the cavity end of the conductors has been shown in the bent condition to illustrate this.

Further features of the hermetic seal provided at each individual conductor lead-through are seen better in FIGS. 4 to 7. Referring to FIG. 4 in particular, there is provided a flange or barrel 27 which is formed as an integral part of the lead-through panel 20 by means of, for example, a series of metal forming processes involving punching, and extrusion. In these operations, the flange portion 27 wall is tapered and thinned symmetrically to be as little as one-fourth of the thickness of the lead-through portion 20. It is desired that the interior surface of the flange portion 27 taper away from the lead-through portion 20 at a small angle of, for example, 3–5°. This fact is indicated by the angle designated by the numeral 28 in FIG. 4. Preferably, the flange portion 27 extends from the lead-through panel 20 into the cavity 15. However, in some applications the flange portion may project externally.

For a purpose to be described, the length of the flange portion 27 and the relation of that length to the passage diameter is important. It is important that the flange portion 27 extend a distance substantially greater than the thickness of the lead-through panel 20. In the FIG. 4, these relative dimensions are demonstrated by dimension line 29 which is considerably longer than the thickness of the panel 20 as designated by dimensional arrow 30. The dimension line 31 depicts the overall length of the passage formed by the flange portion 27.

Received within the passage formed by the flange portion 27 is an insulator bead or member 33. The insulator member 33 is of generally cylindrical shape, but it has a reduced portion 34 extending throughout most of its length with an annular flange 35 extending radially outward from the axis of the insulator member. A hole, or bore, 36 extends through the axis of the insulator member 33 and is on the axis of the passage formed by the flange portion 27 when the insulator member is disposed within the passageway.

During assembly, the strip 13 of conductors 14 has the individual insulator members 33 placed on the conductors, or alternatively, the insulator members are placed in the individual passages, and then the conductors are extended therethrough. At that time, the assembly is subjected to heat in order to cause the insulator material to melt whereby the surface tension of the material will cause it to ball up and seal against the walls of the flange portion 27. At this point it is important to point out two features of the present invention. Firstly, because the two strips 13 of conductors 14 extend as they do, it is possible to have both sets of conductors in position during the melting process. If each of the conductors came out of vertical side walls, the assembler would have to place the enclosure in one position with the conductors extending vertically upward and then subject the assembly to the heat process, then the assembler would have to rotate the enclosure 180° and repeat the process. On the other hand, with the structure disclosed, it is possible to insert and seal both sets of conductors 14 at the same time.

The exact size of the diameter of the passages of the flange portions 27 is not extremely exacting. On the other hand, it is definitely preferred that the seal diameter range from 30 to 60 mils, which it has been found optimizes the strength and the thermal endurance of the seal. Additionally, it has been found that if the size of the seal is limited to 70 mils, insulator materials of glass plastic, glass ceramic, and ceramic glasses may be used, and the surface tension of the material is such that the material will remain in the passageway during the melting process without the necessity of supports of, e.g., graphite. Although 70 mils is a maximum limit to prevent the undue probability of the glass insulator material from dripping out of the passageway, 60 mils is the practical upper size for the normal temperatures that are used in melting the vitreous or glass material. In such case gravity will cause the vitreous or glass material to flow somewhat. The resulting cross-section is shown in FIG. 7 in a somewhat exaggerated form in order that the effect can be seen more easily.

A borosilicate glass such as those commercially designated as 7040, 7050, 7052, 7062, SBN 124, EN-1, and HG-50 is suitable when used with enclosure material such as cobalt-nickel-iron alloys closely similar to those materials sold under the trademarks Kovar, Therlo, Rodar and Sealvac.

The structure of the unit is very important to the accomplishment of the desired end result. Firstly, the disclosed structure has the advantage that the interior of the flange portion 27 is a tapered cone. This will permit use of the less expensive insulator members which do not have a flange such as the flange 35. The flange portion 27 may be sized so that the reduced portion can engage the flange portion and hold the insulator material in position during the heating process. Additionally, it will be noted that the structure is provided with a pair of annular recesses, or channels, 37 and 38 in the lead-through panel 20. These annular recesses 37 and 38 result in a thinned portion of the panel which greatly limits any strains or stresses passing from the lead-through panel to the conductor insulator area. Also, if loads are applied to the conductor 14, the recesses 37 and 38 provide an area of increased flexibility which will permit the insulator material 33 and the flange portion 27 to follow the direction of motion somewhat—thereby reducing the stresses on the insulator material. Along this same line, the flange portion 27 has been made very thin in order to reduce the strength of the flange portion so as to limit the forces which can be applied to the insulator material 33 from the flange portion. This arrangement is particularly advantageous in that the thin wall of the flange greatly reduces any forces from the flange portion 27 to the insulator material 33 caused by changes of temperature of the environment in which the enclosure is located. Additionally, it is important that the flange portion 27 be at least one-half as long as the diameter of the passage. (Dimension line 31 indicates the length of the interior wall of the passageway.) By making the flange portion 27 longer, the leakage path is increased. Additionally, the increased length of the flange portion 27, and therefore the insulator material 33, insures that the glass insulator will have a long and secure grip on the conductor as well as the wall of the flange portion. This would not be true if the flange portion were shorter.

As mentioned previously, enclosures embodying the present invention are particularly useful in that they can be sealed by the cold weld process. This cold weld process is accomplished by pressing together with great force the two peripheral closure flanges, 21 and 22 respectively, on the body 11 and the cap 12. In FIG. 8 it can be seen how the closure flanges 21 and 22 have been joined together and a characteristic pair of channels 44 and 45 have resulted from the cold weld process. The resultant weld is indicated at 46.

To further limit transmittal of stresses and/or strains from the closure flanges 21 and 22 to the insulators, additional mechanical decoupling means are provided. In FIG. 8 it can be seen that the side walls 19 have been relieved at 48 to provide a thinner section 49 extending around the periphery of the base member 11. This presents a stress decoupling area of increased flexibility right along the edge of the side walls 19, which edge adjoins the peripheral closure flange 21.

The stresses and strains which are induced by the cold weld process are particularly acute in square enclosures. Accordingly, additional structural features are preferably incorporated in embodiments of the subject invention. Firstly, the center section 51 of the base member 11 is provided with a series of recessed squares 52, preferably cold formed into the center section, the formation of which results in a large number of small thin sections 53 (see FIGS. 9 and 10 in particular). Ribs 54 extend between each of the recessed squares forming parallelograms. This formation stiffens the center section 21 and reduces the stresses induced in the structure. In FIG. 9 there is shown a section of the base member 11, however it is to be understood that the center section of the cap 12 is preferably similarly shaped.

In addition, the cap 12 is further defined by a peripheral bellows 57 in edge section 58 of the cap 12. This will permit the deformation of the peripheral closure flanges 21 and 22 toward and away from the cavity 15 without inducing undue stresses into the center section of the cap 12 or the base member 11.

It has been found that it is preferable that the conductors be spaced apart on about a 66 mil center-to-center spacing although this is not the actual bottom limit. However, the lower practical or economical limit of the insulators is 40 mils. As an alternative to producing very small seal structures, the conductors leading into the cavity could be positioned in the nonlinear or staggered arrangement such as disclosed in FIG. 11. In FIG. 11 there is disclosed a lead-through portion or panel 61. This panel 61 has a plurality of conductors 64 and one row with a second adjacent row of conductors 65 therein. The conductors 64 have an insulator 66 while the conductors 65 have an insulator 67 while the conductors 65 have an insulator 67. The insulators 66 and 67 are substantially the same as the insulator material, or member 33, and therefore will not be described in further detail. However, it can be seen in FIG. 11 that, by moving the conductors 65 out of alignment with the two conductors 64, the two conductors 64 can be placed closer together.

In certain situations, it is very desirable to get a large number of conductors into the enclosure with a very minimum of space. To this end there is provided a third embodiment of the present invention disclosed in FIG. 12. In this embodiment, a lead-through panel 71 has a plurality of conductors 72 which are placed in close proximity to each other in a line. Then, insulator material 73 is enclosed around the conductors 72 to form a seal between the conductors and the main lead-through panel 71. The lead-through panel 71 has a flange portion which is substantially the same as the flange portion 27 with the extension of the fact that—as seen in the cross-sectional view—the flange portion has an elongated shape rather than a circular shape as disclosed in the previously described embodiments.

As mentioned previously, it is very important that the length of the flange portion be at least half of the width across the passageway through which the conductor passes. However, it should be pointed out further that if the conductors are only bent in one plane (up and down as seen in FIG. 12), the requirement for the dimensional relationship between the length of the flange portion and the width of the passage can be reduced to apply only to the cross-dimension of the insulator material in a direction parallel or nearly parallel to the direction in which the conductors will be bent. In FIG. 12, the dimension line 74 illustrates the important dimension. Although the length of the opening in the lead-through panel 71 is so long that the stated relation to the flange portion is not maintained, the requirement of the particular relationship beween the length of the flange member and the diameter is only important in terms of the direction in which the conductors are bent. It is in this plane of movement that the stresses are induced on the insulator material. Also, during the melting of the insulator material, the panel 71 may be oriented with the length of the opening parallel to ground and with the plane of the panel at about a 45° angle to gravity. And in such case separate supports for the insulator material during the process would not be mandatory.

While only a few embodiments of the present invention have been shown and described in detail, it will be apparent to those skilled in the art that such is by way of illustration only, and numerous changes may be made thereto without departing from the spirit of the present invention. For example, the lead-through assemblies could be provided on a panel which is later affixed to a larger structure.

We claim:

1. In an improved electronic component enclosure:

a generally flat base member defining a plane and having a center section with a plurality of side walls extending therefrom and defining a cavity adapted to receive electronic components, at least one of said side walls having a lead-through portion, said lead-through portion comprising a planar lead-through panel disposed in a plane which is at substantially a 45° angle to the plane of the base member, a plurality of passage means formed in said lead-through panel, each of said passage means including:

a flange portion integral with said lead-through panel and extending from said side wall lead-through panel generally into said cavity and away from said central portion of the base member;

said flange portion defining an opening through which at least one conductor may extend at substantially a right angle to the plane of said lead-through panel into the cavity in a direction away from said central portion of the base member at substantially a 45° angle to the plane of the base member;

at least one conductor extending through each of said openings;

and insulation means connecting each respective conductor to its respective flange portion and hermetically sealing the conductor to its respective flange portion.

2. The invention set forth in claim 1 wherein: there is provided in said side wall lead-through panel around and immediately adjacent each passage means a stress decoupling area where the thickness of the base material is substantially less than the thickness of the base material further away from the passage means, whereby said stress decoupling area which is thinner provides a weakened area having greater flexibility than the area where the material is thicker.

3. The invention set forth in claim 1 wherein:

at least one of said flange portions defines a passage having an elongated cross section with a minor dimension in one direction across the passage and a major dimension in another direction across the passage at the right angle to the minor dimension, said major dimension being many times longer than the minor dimension and extending parallel to the plane of said base member;

a plurality of conductors disposed in a row and extending through said passage with the row extending along said major dimension, each of said conductors having a rectangular cross section with a major dimension of each cross section extending parallel to the major dimension of said passage;

and insulator material filling the area in said passage between the flange portion and said plurality of conductors and insulating the last mentioned conductors from each other and hermetically sealing said last mentioned conductors in said passage.

4. The invention set forth in claim 1 including:

an electronic component in said cavity said component having a plurality of terminals;

and said conductor extending through each of said openings into the cavity being bent from its relation of 45° to the plane of the base member and engaging a terminal on said component in said cavity.

5. The invention set forth in claim 4 including:

a generally flat cap having an outline of the same shape as said base member;

means on the periphery of said cap and said base member sealing said cap to said base member;

a peripheral bellows portion on said cap, said peripheral bellows portion extending around the center section of said cap adjacent said periphery of said cap, at least part of said peripheral bellows portion extending from said center section in a direction at nearly a 90° angle to the plane of the cap and then extending back to a point nearer the plane of said center section of said cap such that said bellows portion has a U-shape cross section which permits the periphery of said cap to be displaced relative to said center section.

6. The invention set forth in claim 5 wherein:

said U-shape cross section of the peripheral bellows portion extends from the cap into the cavity of the enclosure a predetermined distance;

and said side walls of said base member have a sufficient height to space said lead-through panel sufficiently away from said cap to avoid interference between said passage flange portions and said bellows portion.

7. The invention set forth in claim 6 wherein: said base member has a peripheral sealing flange and said cap has a peripheral sealing flange which engage each other, and the said base member and cap peripheral flanges are sealed together by a cold weld seam formed around the periphery of the two members.

8. The invention set forth in claim 1 wherein:

said at least one conductor extending through each respective opening has a thickness and width with the width substantially greater than the thickness, said conductor being arranged so that a dimension line extending from one side of the conductor to the other side of the conductor to measure the width thereof would extend parallel to the plane of the base member, whereby the conductor can be easily bent in a direction toward an electronic component secured to the central portion of the base member in the cavity.

9. The invention set forth in claim 1 wherein:

said flange portions are staggered to form two rows with the flange portions in alternate rows as projected upon a common line parallel to said rows being closer together than the cross dimension of the passage defined by each flange portion.

10. The invention set forth in claim 1 wherein:

said base member is of a material of predetermined thickness, and said base member has a peripheral sealing flange integrally formed at the periphery of said base member, said peripheral sealing flange extending around the periphery of the base member along the side walls of the base member;

and said side walls have an area of reduced thickness along the edge of the side walls where said peripheral flange adjoins said side walls for limiting the transmission of stresses from the peripheral flange to said lead-through portions.

11. In an improved electronic component enclosure:

a generally flat base member defining a plane and having a center section with a plurality of side walls defining a cavity adapted to receive electronic components, a lead-through portion on said side walls, a plurality of passage means formed in said lead-through portion, each of said passage means including:

a flange portion integral with said base member and extending from said lead-through portion generally into said cavity;

said flange portion extending around and defining an opening through which at least one conductor may extend at substantially a right angle to said lead-through portion;

a generally flat cap having a shape complementary to said base member and being sealed to said base member around the periphery of said cap and base member;

one of said cap and base member having a centrally diposed area wherein there is provided:
- a very large number of small sections of very thin thickness, said small sections being arranged in rows;
- a first set of ribs extending in a first direction between adjoining ones of said sections;
- and a second set of ribs extending between adjoining ones of said sections, said first set of ribs extending at a large angle to said second set of ribs;

an electronic component within said cavity, said component having a plurality of terminals;

at least one conductor extending through each of said openings and being connected to one of said terminals of said component;

and insulation means connected to each respective conductor and its respective flange portion and hermetically sealing the conductor to its respective flange portion.

12. In an improved electronic component enclosure having a generally flat base member defining a plane and having a center section with a plurality of side walls defining a cavity adapted to receive an electronic component therein;

with a plurality of passage means formed in said side walls, each of said passage means including:
- a flange portion integral with said base member and extending from the base member generally into said cavity, said flange portion defining an opening having an axis extending at a right angle to said side wall, said opening being adapted to receive at least one conductor therethrough along said axis;

an electronic component within said cavity, said component having a plurality of terminals;

each of said openings having at least one conductor extending therethrough to individual terminals of said component;

and insulation means connecting each respective conductor to its respective flange portion and hermetically sealing the conductor to its respective flange portion, the improvement comprising:
- a generally flat cap having an outline of the same shape as said base member, said cap having a center section defining a plane;
- means on the periphery of said cap and said side walls sealing said cap to said side walls;
- a peripheral bellows portion on said cap disposed adjacent to the side walls and within the cavity defined thereby said bellows portion cross section permitting the periphery of said cap to be displaced relative to the center section thereof.

13. The invention set forth in claim 12 wherein: said U-shape cross section of the peripheral bellows portion extends from the cap into the cavity of the enclosure a predetermined distance.

14. The invention set forth in claim 13 wherein: said base member has a peripheral sealing flange and said cap has a peripheral sealing flange which engage each other, and said base member and cap peripheral flanges are sealed together by a cold weld seam formed around the periphery of the two members.

References Cited

UNITED STATES PATENTS

| | | | |
|---|---|---|---|
| 2,071,597 | 2/1937 | Vasseli | 174—152 XR |
| 2,744,592 | 5/1956 | Remond | 287—189.365 |
| 2,932,684 | 4/1960 | Hales et al. | 174—52 XR |
| 3,304,362 | 2/1967 | August | 174—50.56 |
| 3,379,823 | 4/1968 | Loose | 174—50.61 |

OTHER REFERENCES

Wurmb et al.: German appl. No. 1,088,121, pub. September 1, 1960.

DARRELL L. CLAY, Primary Examiner

U.S. Cl. X.R.

174—50.56; 287—189.365; 317—234